(12) United States Patent
Hilfiger et al.

(10) Patent No.: US 10,113,100 B1
(45) Date of Patent: *Oct. 30, 2018

(54) COMPOSITIONS WITH POLYAZIRIDINE CROSSLINKERS FOR TREATING SUBTERRANEAN FORMATIONS

(71) Applicant: Saudi Arabian Oil Company, Dhahran (SA)

(72) Inventors: Matthew Gary Hilfiger, Katy, TX (US); B. Raghava Reddy, Pearland, TX (US)

(73) Assignee: Saudi Arabia Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,200

(22) Filed: Mar. 20, 2018

Related U.S. Application Data

(63) Continuation of application No. 15/682,836, filed on Aug. 22, 2017, now Pat. No. 9,932,512.

(51) Int. Cl.
*E21B 43/22* (2006.01)
*E21B 33/138* (2006.01)
*C09K 8/512* (2006.01)

(52) U.S. Cl.
CPC ............ *C09K 8/512* (2013.01); *E21B 33/138* (2013.01)

(58) Field of Classification Search
CPC .......... C09K 8/524; C09K 8/805; C09K 8/54; E21B 43/267
See application file for complete search history.

(56) References Cited

U.S. PATENT DOCUMENTS

| 4,288,493 | A | 9/1981 | Kropp |
| 4,532,298 | A | 7/1985 | Kimura et al. |
| 4,605,698 | A | 8/1986 | Braden |
| 6,063,286 | A | 5/2000 | Steuerle et al. |
| 6,217,432 | B1 | 4/2001 | Woo |
| 8,283,287 | B2 | 10/2012 | Aihara et al. |
| 8,377,853 | B2 | 2/2013 | Ballard |
| 2012/0247768 | A1 | 10/2012 | Ballard |
| 2016/0215208 | A1 | 7/2016 | Monastiriotis et al. |
| 2016/0333260 | A1 | 11/2016 | Drake et al. |

FOREIGN PATENT DOCUMENTS

| JP | 2003105254 A | 4/2003 |
| JP | 5155074 B2 | 2/2013 |
| KR | 2013051533 A | 5/2013 |
| WO | WO2010015639 A1 | 2/2010 |
| WO | WO2017062532 A1 | 4/2017 |

*Primary Examiner* — Zakiya W Bates
(74) *Attorney, Agent, or Firm* — Fish & Richardson P.C.

(57) ABSTRACT

The present application provides a composition containing a maleic anhydride copolymer, a polyaziridine crosslinker, optionally an additional crosslinking agent such as an amine crosslinker, and optionally a gel time control agent. Methods of using the composition to treat a subterranean formation are also provided.

27 Claims, No Drawings

COMPOSITIONS WITH POLYAZIRIDINE CROSSLINKERS FOR TREATING SUBTERRANEAN FORMATIONS

CROSS-REFERENCE TO RELATED APPLICATIONS

This application is a continuation application of and claims the benefit of priority to U.S. application Ser. No. 15/682,836, filed on Aug. 22, 2017, the contents of which are hereby incorporated by reference.

TECHNICAL FIELD

This document relates to methods and compositions used in treating subterranean formations.

BACKGROUND

Currently, compositions to seal off undesirable fluid paths such as gas flow channels, for example behind casings, pipe microannuli, and fractured cement sheaths are based on non-aqueous epoxy monomers mixed with amines, or polymerizable hydrocarbon-based monomers. While these solutions have a reasonable success rate, their toxicity is of major concern, especially when the treated zones are near populated areas or aquifers. Although less toxic formulations are known, using such formulations at low temperatures, for example, 40 degrees Fahrenheit (° F.), and reliably controlling gel times in such formulations at elevated temperatures has been problematic. Improved sealing of flow channels in certain materials, such as set cement, would improve well productivity and decrease well maintenance costs.

SUMMARY

The present application provides, inter alia, an easy to apply water-based sealing composition for treating subterranean formations. These compositions represent relatively environmentally friendlier alternatives to currently used fluids based on epoxy systems and monomers. The wide application temperature window (for example, 40° F.-200° F.) makes the fluid compositions useful for both onshore and offshore applications. The sealing compositions described in this document have controllable gel times, and contain cross-linkable resins and at least one crosslinker. Prior to crosslinking, the sealing composition is a thin fluid that flows freely into the porous space within the subterranean formation. Upon chemical reaction between the crosslinker and the resin, the composition becomes a stiff gel thereby forming a gel plug in the porous space of the subterranean formation.

In a first general aspect, the present application provides a method of treating a subterranean formation comprising:
i) providing to a subterranean formation a composition comprising:
a maleic anhydride copolymer comprising:
repeat units I and II:

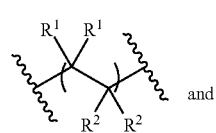

I

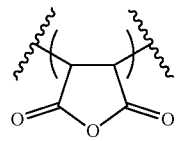

II wherein each $R^1$ is independently selected from the group consisting of —H, —O—$C_{1-5}$ alkyl, and —$C_{1-5}$ alkyl, and each $R^2$ is independently selected from the group consisting of —H, —O—$C_{1-5}$ alkyl, and —$C_{1-5}$ alkyl; and
at least one hydrolyzed repeat unit selected from repeat units III and IV:

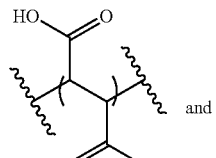

III and

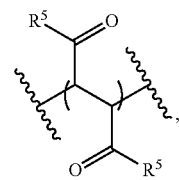

IV wherein each $R^5$ is independently selected from —OH and $NH_2$, provided that at least one of $R^5$ is $NH_2$,
or a salt thereof; and
a polyaziridine crosslinker comprising at least two aziridine moieties, or a salt thereof; and
ii) crosslinking the maleic anhydride copolymer, or a salt thereof, and the polyaziridine crosslinker, or a salt thereof, to form a sealant.

In some embodiments, forming the sealant occurs near a casing, a casing-casing annulus, a tubing-casing annulus, or a casing-formation annulus.

In some embodiments, the sealant is a gel plug.

In some embodiments, the crosslinking of the composition occurs in contact with a set cement.

In some embodiments, the subterranean formation comprises a wellbore comprising a cement sheath.

In some embodiments, forming the sealant occurs in at least one of: a fracture in the cement sheath and a microannulus.

In some embodiments, forming the sealant prevents or retards undesired loss or flow of a wellbore fluid into the subterranean formation or of a formation fluid into the wellbore.

In some embodiments, the maleic anhydride copolymer, or a salt thereof, and the polyaziridine crosslinker, or a salt thereof, remain in an uncrosslinked state until placement in an appropriate location in the wellbore.

In some embodiments, the providing comprises top-down squeezing the composition down an annulus.

In some embodiments, the providing comprises injecting the composition downhole.

In some embodiments, forming the sealant comprises a conformance control, a wellbore plug and abandonment, or thermal wellbore isolation gel system.

In a second general aspect, the present application provides a composition for treating a subterranean formation, the composition comprising:

a maleic anhydride copolymer comprising:
repeat units I and II:

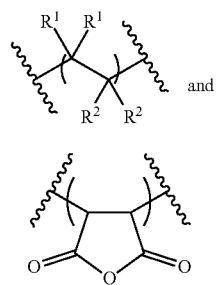

and

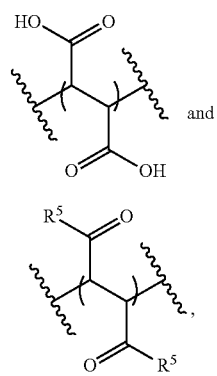

wherein each $R^1$ is independently selected from the group consisting of —H, —O—$C_{1-5}$ alkyl, and —$C_{1-5}$ alkyl, and each $R^2$ is independently selected from the group consisting of —H, —O—$C_{1-5}$ alkyl, and —$C_{1-5}$ alkyl; and at least one hydrolyzed repeat unit selected from repeat units III and IV:

III and

IV wherein each $R^5$ is independently selected from —OH and $NH_2$, or a salt thereof;

a polyaziridine crosslinker comprising at least two aziridine moieties, or a salt thereof; and a gel time control agent.

In some embodiments, the composition comprises an aqueous carrier solvent.

In some embodiments, the gel time control agent accelerates or retards formation of the gel from the maleic anhydride copolymer and the polyaziridine crosslinker in the absence of a set cement.

In some embodiments, the gel time control agent is selected form the group consisting of citric acid, trisodium phosphate, and a combination thereof.

Implementations of the first and second general aspects may include one or more of the following features.

In some embodiments, the salt of the maleic anhydride copolymer is an ammonium salt, an alkali metal salt, or an alkali earth metal salt.

In some embodiments, each $R^1$ is H, and each $R^2$ is independently selected from the group consisting of —H, —OCH$_3$, and —CH$_3$; or each $R^2$ is H, and each $R^1$ is independently selected from the group consisting of —H, —OCH$_3$, and —CH$_3$.

In some embodiments, the repeat unit I has formula:

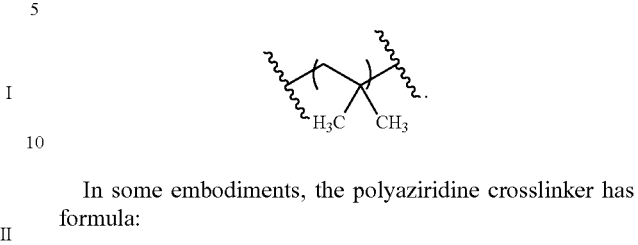

In some embodiments, the polyaziridine crosslinker has formula:

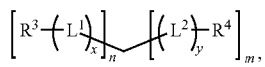

or a salt thereof, wherein:

$L^1$ and $L^2$ at each occurrence are each independently selected from the group consisting of —$C_{1-6}$ alkylene-, —$C_{1-6}$ alkenylene-, —$C_{1-6}$ alkynylene-, —(O—$C_{1-4}$ alkylene)$_p$-, —($C_{1-4}$ alkylene-O—)$_p$—, —O—, —S—, NH—, and —C(=O)—, wherein said —$C_{1-6}$ alkylene-, —$C_{1-6}$ alkenylene-, —$C_{1-6}$ alkynylene-, and —$C_{1-4}$ alkylene- are each optionally substituted with 1, 2, or 3 substituents independently selected from the group consisting of -halo, —CN, —OH, —$C_{1-3}$ alkyl, —$C_{1-3}$ alkoxy, —$C_{1-3}$ haloalkyl, —$C_{1-3}$ haloalkoxy, -amino, —$C_{1-3}$ alkylamino, and -di($C_{1-3}$ alkyl)amino;

each $R^3$ is selected form the group consisting of —H, —$C_{1-6}$ alkyl, —$C_{1-6}$ alkenyl, —$C_{1-6}$ alkynyl, -halo, —CN, —OH, —$C_{1-3}$ alkoxy, —$C_{1-3}$ haloalkyl, —$C_{1-3}$ haloalkoxy, -amino, —$C_{1-3}$ alkylamino, -di($C_{1-3}$ alkyl)amino, —(O—$C_{1-4}$ alkylene)$_p$-H, and —($C_{1-4}$ alkylene-O—)$_p$—$C_{1-6}$ alkyl;

each $R^4$ is selected from the group consisting of:

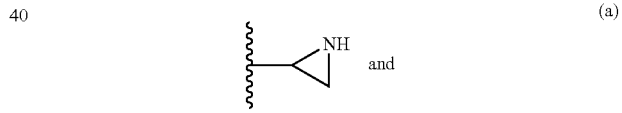

and

wherein each of (a) and (b) is optionally substituted with 1, 2, 3, or 4 substituents independently selected from the group consisting of halo, CN, OH, amino, $C_{1-3}$ alkylamino, di($C_{1-3}$ alkyl)amino, —$C_{1-3}$ alkyl, $C_{1-3}$ alkoxy, $C_{1-3}$ haloalkyl, and $C_{1-3}$ haloalkoxy;

p at each occurrence is independently an integer from 0 to 40;

x and y at each occurrence are each independently an integer from 0 to 10;

m is an integer from 2 to 4; and n is an integer from 0 to 4;

provided that a sum of m and n is 4.

In some embodiments:

m is 3 and n is 1;

x is 1 and $L^1$ is selected form the group consisting of —$C_{1-6}$ alkylene-, —$C_{1-6}$ alkenylene-, —(O—$C_{1-3}$ alkylene)$_p$-, and —($C_{1-3}$ alkylene-O—)$_p$—;

each p is an integer form 1 to 20;

$R^3$ is selected form the group consisting of H, —$C_{1-3}$ alkyl, —OH, —$C_{1-3}$ alkoxy, —$C_{1-3}$ haloalkyl, —$C_{1-3}$ haloalkoxy, —(O—$C_{1-3}$ alkylene)$_p$-H, and —($C_{1-3}$ alkylene-O—)$_p$—$C_{1-3}$ alkyl;

each y is an integer from 0 to 5, and each $L^2$ is independently selected from $C_{1-4}$ alkylene-, —O—, NH—, and —C(=O)—; and each $R^4$ is selected from the group consisting of:

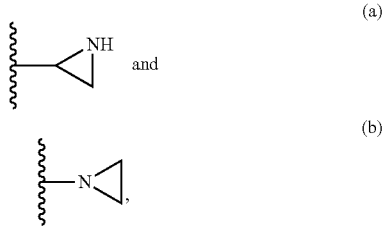

wherein each of (a) and (b) is optionally substituted with 1 or 2 substituents independently selected from the group consisting of —$C_{1-3}$ alkyl, $C_{1-3}$ alkoxy, $C_{1-3}$ haloalkyl, and $C_{1-3}$ haloalkoxy.

In some embodiments, the polyaziridine crosslinker is a compound of formula:

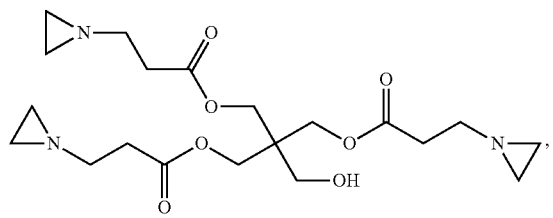 [SMILES: O=C(CCN1CC1)OCC(CO)(COC(=O)CCN1CC1)COC(=O)CCN1CC1]

or a salt thereof.

In some embodiments, an amount of the polyaziridine crosslinker in the composition is in a range of about 0.1 wt. % to about 20 wt. % relative to an amount of the maleic anhydride copolymer.

In some embodiments, pH of the composition is in a range of about 5 to about 9.

In some embodiments, viscosity of the composition is from about 80 cP to about 120 cP.

In some embodiments, a combined amount of the maleic anhydride copolymer and the polyaziridine crosslinker in the composition is in a range of about 10 wt. % to about 30 wt. % relative to a weight of the composition.

In some embodiments, the composition comprises an amine crosslinker.

In some embodiments, the amine crosslinker is selected from the group consisting of a polyamine, a polyethyleneimine, and a combination thereof.

In some embodiments, the amine crosslinker is tetraethylenepentamine (TEPA).

In some embodiments, the composition has gel time of less than about 1.5 hours at about 70° F.

In some embodiments, the composition has gel time of less than about 3 hours at about 40° F.

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Other features and advantages of the present application will be apparent from the following detailed description, and from the claims.

DETAILED DESCRIPTION

Fractures and microannuli within and around the cement sheath can lead to annular influx of unwanted water, reservoir liquids, or gas from the formation that can travel to the surface. This can result in leaks in wells that have been plugged, or lead to annular pressure buildup in producing wells, which can then require well shut-in until remediated to prevent casing collapse or wellbore failure. Leaking wells pose a costly environmental hazard, and curtailing or shutting in a producing well has substantial financial impact that in some cases can reach hundreds of millions of dollars per well per year.

The present application provides a resin composition for sealing such microfractures and annuli, to prevent unwanted flow and return wells to a desired safe and profitable state. The water based fluid compositions described in this document are designed for deepest possible penetration into microfractures and annuli to provide the best seal against unwanted fluid flow. These treatment fluids are solids-free with low viscosity during the pumping stage, and exhibit a rapid, nearly right angle set at the desired temperature. In one example, the water soluble treatment compositions contain a resin that can be crosslinked with a polyaziridine crosslinker to provide controllable gel times that can be tuned to meet operational needs. An example would be a resin system designed for use in 120° F. conditions with a gel set time achieved in one hour. Depending on the formulation, reasonable gel times from 1-2 hours can be achieved for application temperatures from 40° F. to 200° F. Embodiments of the compositions, as well as the methods of making and using the compositions for treating a subterranean formation, are described in this document.

Definitions

As used in this document, the term "about" and "approximately" can be defined in certain embodiments as plus or minus 10% of the indicated value.

As used in this document, the term "compound" can include all stereoisomers, geometric isomers, tautomers, and isotopes of the structures named or depicted. Compounds in this document identified by name or structure as one particular tautomeric form are intended to include other tautomeric forms unless otherwise specified.

Throughout the definitions, the term "$C_{n-m}$" indicates a range which includes the endpoints, wherein n and m are integers and indicate the number of carbon atoms. Examples include $C_{1-4}$, $C_{1-6}$, and the like.

As used in this document, the phrase "optionally substituted" means unsubstituted or substituted. As used in this document, the term "substituted" means that a hydrogen atom is removed and replaced by a substituent. It is to be understood that substitution at a given atom is limited by valency.

As used in this document, the term "$C_{n-m}$ alkyl", employed alone or in combination with other terms, refers to a monovalent saturated hydrocarbon group that can be straight-chain (linear) or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2, 2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used in this document, the term "$C_{n-m}$ alkylene" means a bivalent saturated branched, or straight chain (linear) chemical group containing only carbon and hydrogen atoms, such as methylene, ethylene, n-propylene, iso-propylene, n-butylene, iso-butylene, sec-butylene, tert-butylene, n-pentylene, iso-pentylene, sec-pentylene and neo-pentylene. Alkylene groups can either be unsubstituted or substituted with one or more substituents. In some embodiments, alkylene groups include 1 to 9 carbon atoms (for example, 1 to 6 carbon atoms, 1 to 4 carbon atoms, or 1 to 2 carbon atoms).

As used in this document, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms. The term "$C_{n-m}$ alkenylene" refers to a divalent alkenyl group.

As used in this document, "$C_{n-m}$ alkynyl" means a straight or branched chain chemical group containing only carbon and hydrogen, containing n to m carbon atoms and containing at least one carbon-carbon triple bond, such as ethynyl, 1-propynyl, 1-butynyl, 2-butynyl, and the like. In various embodiments, alkynyl groups can either be unsubstituted or substituted with one or more substituents. Typically, alkynyl groups will comprise 2 to 9 carbon atoms (for example, 2 to 6 carbon atoms, 2 to 4 carbon atoms, or 2 carbon atoms). The term "$C_{n-m}$ alkynylene" refers to a divalent alkynyl group.

As used in this document, the term "$C_{n-m}$ alkoxy", employed alone or in combination with other terms, refers to a group of formula —O—$C_{n-m}$ alkyl, wherein the alkyl group contains n to m carbon atoms. Exemplary alkoxy groups include, but are not limited to, methoxy, ethoxy, propoxy (for example, n-propoxy and isopropoxy), butoxy (for example, n-butoxy and tert-butoxy), and the like. In some embodiments, the alkoxy group has 1 to 6, 1 to 4, or 1 to 3 carbon atoms.

As used in this document, "halo" refers to a halogen atom such as F, Cl, Br, or I. In some embodiments, a halo is F, Cl, or Br. In other embodiments, halo is F, Cl, or I. In other embodiments, halo is F, I, or Br.

As used in this document, the term "$C_{n-m}$ haloalkyl", employed alone or in combination with other terms, refers to an alkyl group having from one halogen atom to 2s+1 halogen atoms which can be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used in this document, "$C_{n-m}$ haloalkoxy" refers to a group of formula —O— haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used in this document, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (for example, N-(n-propyl)amino and N-isopropylamino), N-butylamino (for example, N-(n-butyl)amino and N-(tert-butyl)amino), and the like.

As used in this document, the term "di $C_{n-m}$ alkylamino" refers to a group of formula —N(alkyl)$_2$, wherein each alkyl group independently has n to m carbon atoms. In some embodiments, each alkyl group has 1 to 6, 1 to 4, or 1 to 3 carbon atoms. Examples of dialkylamino groups include, but are not limited to, N,N-methylethylamino, N,N-diethylamino, N,N-propylethylamino, N,N-butylisopropylamino, and the like.

The term "amino" as used in this document refers to a $NH_2$ group. In some embodiments, the term "amino" also refers to the corresponding ammonium ion salts.

The term "carboxyl" as used in this document refers to —C(=O)O— group. In some embodiments, the carboxyl group is protonated.

The term "solvent" as used in this document refers to a liquid that can dissolve a solid, another liquid, or a gas. Non-limiting examples of solvents are silicones, organic compounds, water, alcohols, ionic liquids, and supercritical fluids.

The term "number-average molecular weight" as used in this document refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers described in this document are number-average molecular weights.

The term "weight-average molecular weight" as used in this document refers to Mw, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used in this document refers to a temperature of about 15 degrees Celsius (° C.) to about 28° C.

The term "standard temperature and pressure" as used in this document refers to 20° C. and 101 Kilopascals (kPa).

As used in this document, "degree of polymerization" is the number of repeating units in a polymer.

As used in this document, the term "polymer" refers to a molecule having at least one hundred units of at least one repeat unit and can include copolymers.

The term "copolymer" as used in this document refers to a polymer that includes at least two different repeating units. A copolymer can include any suitable number of repeating units.

The term "downhole" as used in this document refers to under the surface of the earth, such as a location within or fluidly connected to a wellbore.

As used in this document, the term "drilling fluid" refers to fluids, slurries, or muds used in drilling operations downhole, such as during the formation of the wellbore.

As used in this document, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this document, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used in this document, the term "fracturing fluid" refers to fluids or slurries used downhole during fracturing operations.

As used in this document, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in this document, the term "completion fluid" refers to fluids or slurries used downhole during the completion phase of a well, including cementing compositions.

As used in this document, the term "remedial treatment fluid" refers to fluids or slurries used downhole for remedial treatment of a well. Remedial treatments can include treatments designed to increase or maintain the production rate of a well, such as stimulation or clean-up treatments.

As used in this document, the term "abandonment fluid" refers to fluids or slurries used downhole during or preceding the abandonment phase of a well.

As used in this document, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used in this document, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used in this document, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used in this document, the term "packer fluid" refers to fluids or slurries that can be placed in the annular region of a well between tubing and outer casing uphole of a packer. In various examples, the packer fluid can provide hydrostatic pressure in order to lower differential pressure across the sealing element, lower differential pressure on the wellbore and casing to prevent collapse, and protect metals and elastomers from corrosion.

As used in this document, the term "fluid" refers to liquids and gels, unless otherwise indicated.

As used in this document, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used in this document, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used in this document, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used in this document, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (for example, a fatty acid methyl ester), 2-butoxy ethanol, butyl acetate, butyl lactate, furfuryl acetate, dimethyl sulfoxide, dimethyl formamide, a petroleum distillation product of fraction (for example, diesel, kerosene, napthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 weight percent (wt %) to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Compositions for Treating a Subterranean Formation

Provided in this disclosure is a composition including a maleic anhydride copolymer containing at least one hydrolyzed repeat unit, and a polyaziridine crosslinker containing at least two aziridine moieties. In some embodiments, the composition includes a carrier fluid such as an aqueous carrier fluid. In some embodiments, the composition also includes at least one additional crosslinking reagent such as an amine crosslinker (for example, tetraethylenepentaamine (TEPA)). In some embodiments, the composition also includes at least one additional ingredient such as a gel time control agent.

Certain embodiments of the maleic anhydride copolymers, the polyaziridines, the additional crosslinking reagents, the additional ingredients and the carrier fluids are described later.

Crosslinkable Resins

In some embodiments, the maleic anhydride copolymer includes repeat units I and II:

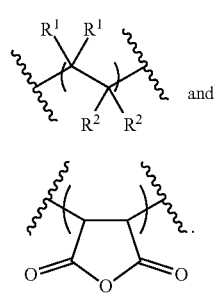

Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV:

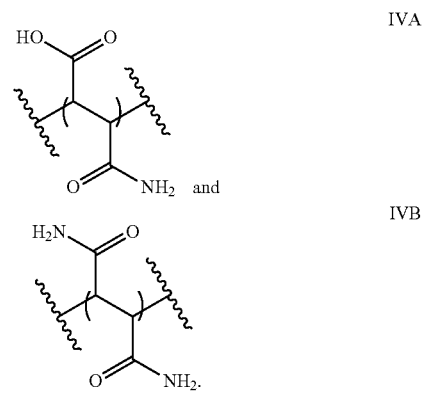

Each $R^5$ is independently selected from —OM and $NH_2$, provided that at least one of $R^5$ is $NH_2$; and M is H, an alkali or alkaline earth metal ion, or an ammonium ion.

In some embodiments, the present disclosure provides a salt of the hydrolyzed maleic anhydride copolymer, such as an ammonium salt, an alkali metal salt, or an alkali earth metal salt. In some aspects of these embodiments, the salt is formed between an anion of a carboxyl group of the hydrolyzed repeat unit III or IV, and an ammonium cation ($NH_4^+$), an alkali metal cation, or an alkali earth metal cation. Suitable examples of alkali metal cations include $Na^+$ and $K^+$. Suitable examples of alkali earth metal cations include $Mg^{2+}$, and $Ca^{2+}$.

In some embodiments, the repeat unit IV had formulae IVA and IVB, respectively, as shown below:

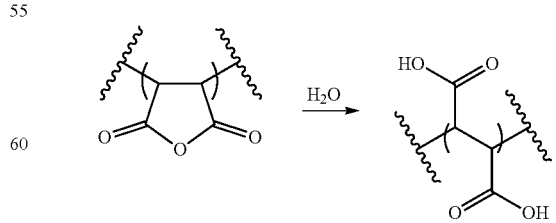

The "hydrolyzed" repeat units III and IV can be formed by a reaction of a repeat unit II with water, for example, as follows:

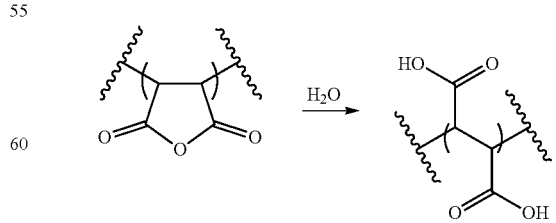

In another example, hydrolyzed maleic anhydride copolymers can be produced by exposing a maleic anhydride copolymer including repeat units I and II to a sodium hydroxide solution. Referring to the earlier reaction scheme, exposure to the sodium hydroxide solution can hydrolyze a portion of the maleic anhydride functional groups to provide the 1,2-dicarboxylic acid repeat unit III, for example, as its sodium salt. Other suitable basic solutions can also be used to hydrolyze at least a portion of the maleic anhydride repeat units II of the maleic anhydride copolymer. The ratio of repeat units III to II can be increased, in one example, by increasing the equivalents of sodium hydroxide used in the hydrolysis reaction or increasing the reaction time, or both. Alternatively, acid catalyzed hydrolysis can be used to produce the 1,2-dicarboxylic acid repeat unit III from at least a portion of the maleic anhydride repeat units II present in the maleic anhydride copolymer.

When the hydrolyzed repeat unit of formula IV has formula IVA or IVB, the repeat unit can be referred to as an "ammonolyzed" repeat unit, and can be obtained by reacting a repeat unit of formula II with ammonium hydroxide. For example, the repeat unit of Formula IVA can be obtained as follows:

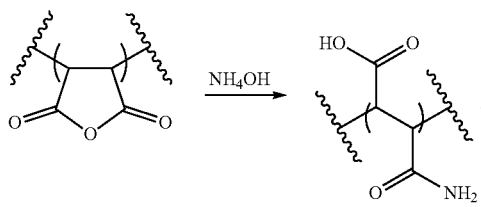

In this example, exposure to the ammonium hydroxide solution hydrolyzes and ammonolyzes a portion of the maleic anhydride functional groups to provide repeat units III and IV (a carboxylic acid repeat unit and a repeat unit containing a carboxylic acid and an amide groups). The ratio of repeat units IV to II can be increased by increasing the equivalents of ammonium hydroxide used in the hydrolysis reaction (for example, hydrolysis/ammonolysis) or increasing the reaction time, or both.

In some embodiments, the at least one hydrolyzed repeat unit in the maleic anhydride copolymer includes repeat unit III In some embodiments, the ratio of repeat unit III to repeat unit II is about 1:10 to about 10:1. For example, the ratio of repeat unit III to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit III to repeat unit II is about 1:2. In some embodiments, the ratio of repeat unit III to repeat unit II is about 2:1.

In some embodiments, the at least one hydrolyzed repeat unit in the maleic anhydride copolymer includes repeat unit IV.

In some embodiments, the ratio of repeat unit IV to repeat unit II is about 1:10 to about 10:1. For example, the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit IV to repeat unit II is about 1:2.

In some embodiments, the maleic anhydride copolymer includes repeat units III and IV. In such a copolymer, the ratio of repeat unit III to repeat unit II can be about 1:10 to about 10:1, and the ratio of the repeat unit IV to repeat unit II can about 1:10 to about 10:1. For example, the ratio of repeat unit III to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, and the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10.

In some embodiments, each $R^1$ in unit I is independently selected from the group consisting of —H, —OCH$_3$, and —CH$_3$ and each $R^2$ is independently selected from the group consisting of —H, —OCH$_3$, and —CH$_3$. In one example of such embodiments, each $R^1$ can be H, and each $R^2$ can be independently selected from the group consisting of —H, —OCH$_3$, and —CH$_3$.

In some embodiments, repeat unit I is selected from the group consisting of:

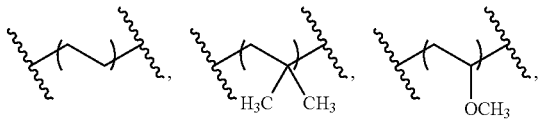

and combinations thereof.

For example, repeat unit I can have the structure:

In some embodiments, repeat unit I has the structure:

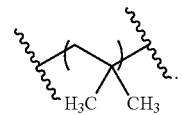

In some embodiments, the distribution of repeat unit I and any of the units II, III or IV can be alternating, random or in blocks, in which case the resulting copolymers are referred to as alternating, random or block copolymers, respectively. In an embodiment, the copolymer is an alternating copolymer, with alternating repeat unit I and any of the repeat units II, III or IV.

In some embodiments, the maleic anhydride copolymer includes at least one repeat unit of formula V:

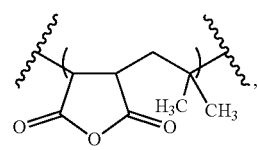

or a salt thereof.

In some embodiments, the maleic anhydride copolymer includes at least one repeat unit of formula VI:

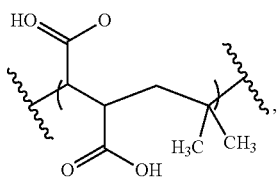

or a salt thereof.

In some embodiments, the maleic anhydride copolymer includes at least one repeat unit of formula VI:

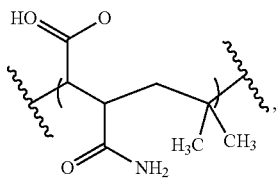

or a salt thereof.

In some embodiments, the maleic anhydride copolymer, or a salt thereof, includes the repeat units:

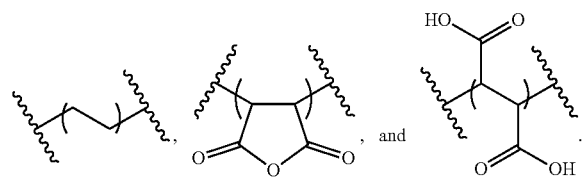

In some embodiments, the maleic anhydride copolymer, or a salt thereof, includes the repeat units:

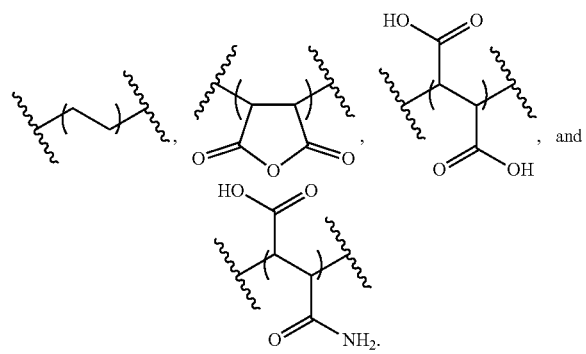

In some embodiments, the maleic anhydride copolymer, or a salt thereof, includes the repeat units:

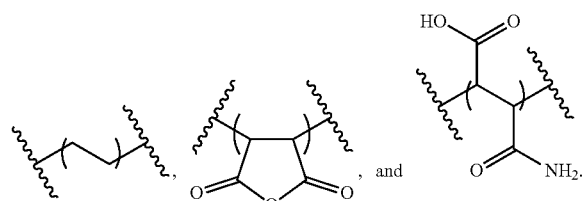

In some embodiments, the maleic anhydride copolymer, or a salt thereof, includes the repeat units:

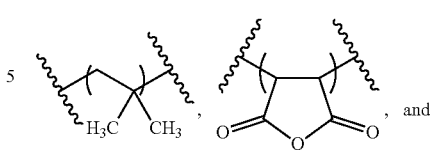

In some embodiments, the maleic anhydride copolymer, or a salt thereof, includes the repeat units:

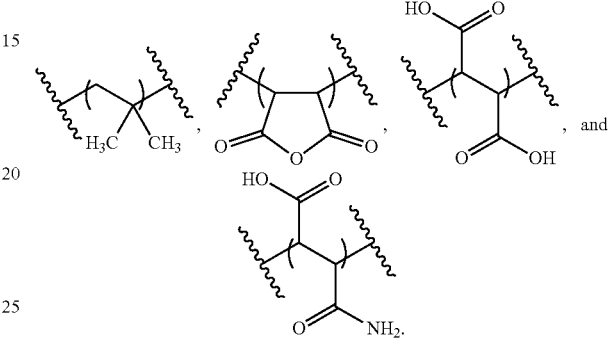

In some embodiments, the maleic anhydride copolymer, or a salt thereof, includes the repeat units:

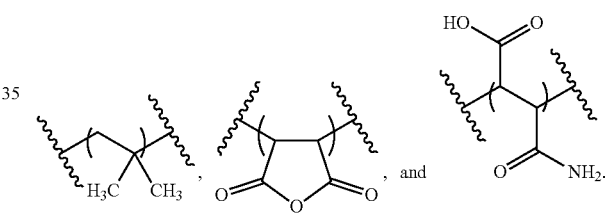

In some embodiments, the maleic anhydride copolymer has a weight-average molecular weight of about 10,000 Daltons (Da) to about 500,000 Da. For example, the maleic anhydride copolymer can have a weight-average molecular weight of about 10,000-100,000 Da, about 20,000-90,000 Da, about 30,000-70,000 Da, about 40,000-60,000 Da, or a weight-average molecular weight of about 45,000-55,000 Da or a weight-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a weight-average molecular weight of about 100,000-500,000 Da, about 200,000-400,000 Da, about 250,000-350,000 Da or a weight-average molecular weight of about 100,000 Da, 150,000 Da, 200,000 Da, 250,000 Da, 300,000 Da, 350,000 Da, 400,000 Da, 450,000 Da or about 500,000 Da. The maleic anhydride copolymer can have a weight-average molecular weight of about 50,000 Da. The maleic anhydride copolymer has a weight-average molecular weight of about 300,000 Da.

In some embodiments, the maleic anhydride copolymer has a number-average molecular weight of about 10,000 Da to about 500,000 Da. For example, the maleic anhydride copolymer can have a number-average molecular weight of about 10,000-100,000 Da, about 20,000-90,000 Da, about 30,000-70,000 Da, about 40,000-60,000 Da, or a number-average molecular weight of about 45,000-55,000 Da or a number-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a number-average molecular weight of about 100,000-500,000 Da, about 200,000-400,000 Da, about 250,000-350,000 Da or a number-average molecular weight of about 100,000 Da, 150,000 Da, 200,000 Da, 250,000 Da, 300,000 Da, 350,000 Da, 400,000 Da, 450,000 Da or about 500,000 Da. The maleic anhydride copolymer can have a number-average molecular weight of about 50,000 Da. The maleic anhydride copolymer has a number-average molecular weight of about 300,000 Da.

Examples of suitable maleic anhydride copolymers include ISOBAM® polymers from Kuraray Company (Tokyo, Japan), ethylene-maleic anhydride copolymers and propylene-maleic anhydride copolymers from Honeywell Corporation (USA), and ZEMAC® copolymers from Vertellus (Spain). In some embodiments, the maleic anhydride copolymer is an amide-ammonium type ISOBAM® copolymer, such as ISOBAM® 104 or ISOBAM® 110.

Polyaziridine Crosslinkers

In some embodiments, the composition contains a polyaziridine crosslinker, capable of chemically reacting with the hydrolyzed repeat unit within the maleic anhydride copolymer, thereby covalently crosslinking the repeat units of the copolymer.

In some embodiments, the polyaziridine crosslinker in the composition containing a crosslinkable maleic anhydride copolymer is a compound of formula:

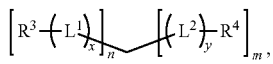

or a salt thereof.

Each $L^1$ and $L^2$ at each occurrence is independently —$C_{1-6}$ alkylene-, —$C_{1-6}$ alkenylene-, —$C_{1-6}$ alkynylene-, —(O—$C_{1-4}$ alkylene)$_p$-, —($C_{1-4}$ alkylene-O)$_p$—(S—$C_{1-4}$ alkylene)$_p$-, —($C_{1-4}$ alkylene-S)$_p$—(NH—$C_{1-4}$ alkylene)$_p$-, —($C_{1-4}$ alkylene-NH)$_p$—, —O(C=O)$C_{1-4}$ alkylene)$_p$-, or —($C_{1-4}$ alkylene-(C=O)O)$_p$—. In some embodiments, each of the —$C_{1-6}$ alkylene-, —$C_{1-6}$ alkenylene-, —$C_{1-6}$ alkynylene-, and —$C_{1-4}$ alkylene- groups of $L^1$ or $L^2$ is optionally substituted with 1, 2, or 3 substituents. Each of these substituents is independently -halo, —CN, —OH, —$C_{1-3}$ alkyl, —$C_{1-3}$ alkoxy, —$C_{1-3}$ haloalkyl, —$C_{1-3}$ haloalkoxy, -amino, —$C_{1-3}$ alkylamino, or -di($C_{1-3}$ alkyl)amino.

Each $R^3$ is selected form the group consisting of —H, —$C_{1-6}$ alkyl, —$C_{1-6}$ alkenyl, —$C_{1-6}$ alkynyl, —NH$_2$, -halo, —CN, —OH, —$C_{1-3}$ alkoxy, —$C_{1-3}$ haloalkyl, —$C_{1-3}$ haloalkoxy, -amino, —$C_{1-3}$ alkylamino, -di($C_{1-3}$ alkyl) amino, —(O—$C_{1-4}$ alkylene)$_p$-H, and —($C_{1-4}$ alkylene-O—)$_p$—$C_{1-6}$ alkyl.

Each $R^4$ is independently an aziridine moiety (a) or (b), as shown below:

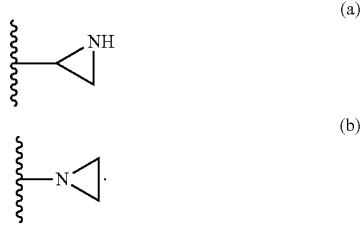

In some embodiments, each of (a) and (b) is optionally substituted with 1, 2, 3, or 4 substituents. Each of these optional substituents of (a) or (b) is independently halo, CN, OH, amino, $C_{1-3}$ alkylamino, di($C_{1-3}$ alkyl)amino, —$C_{1-3}$ alkyl, $C_{1-3}$ alkoxy, $C_{1-3}$ haloalkyl, or $C_{1-3}$ haloalkoxy.

"p" at each occurrence is independently an integer from 0 to 40 (for example, 10, 20, 30, or 40); "x" at each occurrence is independently an integer from 0 to 10 (for example, 0, 1, 2, 3, 4, 5, or 6); "y" at each occurrence is independently an integer from 0 to 10 (for example, 0, 1, 2, 3, 4, 5, or 6); "m" is an integer from 2 to 4 (for example, 2, 3, or 4); and "n" is an integer from 0 to 2 (for example, 0, 1, or 2); provided that a sum of m and n is 4.

In some embodiments, $L^1$ is selected form the group consisting of —$C_{1-6}$ alkylene-, —$C_{1-6}$ alkenylene-, —(O—$C_{1-3}$ alkylene)$_p$-, and —($C_{1-3}$ alkylene-O—)$_p$—.

In some embodiments, p is an integer form 0 to 30, from 0 to 20, or from 0 to 10.

In other embodiments, p is an integer from 1 to 40, from 1 to 30, from 1 to 20, or from 1 to 10.

In some embodiments, x is 1, 2, or 3.

In some embodiments, x is 1. In some aspects of these embodiments, $L^1$ is —$C_{1-6}$ alkylene-, and $R^3$ is NH$_2$, OH, —$C_{1-3}$ alkoxy, —$C_{1-3}$ haloalkoxy, or a polyethylene glycol (PEG) moiety. In other aspects of these embodiments, $R^3$ is H.

In some embodiments, when x is 3, $L^1$ at first occurrence is —$C_{1-6}$ alkylene-, $L^1$ at second occurrence is —NH—, $L^1$ at third occurrence —C(=O)—, and the moiety of formula $(L^1)_x$ is —$C_{1-6}$ alkylene-NH(C=O)— or —(C=O)NH—$C_{1-6}$ alkylene-. In this example, $R^3$ can be —$C_{1-6}$ alkyl, —OH, —$C_{1-3}$ alkoxy, —$C_{1-3}$ haloalkyl, —$C_{1-3}$ haloalkoxy, -amino, —$C_{1-3}$ alkylamino, or -di($C_{1-3}$ alkyl)amino. $R^3$ can also be a group of formula —(O—$C_{1-4}$ alkylene)$_p$-H, or a group of formula —($C_{1-4}$ alkylene-O—)$_p$—$C_{1-6}$ alkyl, such as a polyethylene glycol (PEG) group or a polypropylene glycol (PPG) group.

In some embodiments, each $R^3$ is independently H, —NH$_2$, —$C_{1-3}$ alkyl, —OH, —$C_{1-3}$ alkoxy, —$C_{1-3}$ haloalkyl, —$C_{1-3}$ haloalkoxy, —(O—$C_{1-3}$ alkylene)$_p$-H, or —($C_{1-3}$ alkylene-O—)$_p$—$C_{1-3}$ alkyl.

In some embodiments, y is an integer from 0 to 5 (for example, y is 0, 1, 2, 3, 4, or 5).

In some embodiments, when y is 4, $L^2$ at first occurrence is —$C_{1-6}$ alkylene-, $L^2$ at second occurrence is —O—, $L^2$ at third occurrence —C(=O)—, $L^2$ at fourth occurrence is —$C_{1-6}$ alkylene-, and the moiety of formula $(L^2)_y$ is —$C_{1-6}$ alkylene-O(C=O)—$C_{1-6}$ alkylene- or —$C_{1-6}$ alkylene-(C=O)O—$C_{1-6}$ alkylene-.

In some embodiments, each $L^2$ is independently —$C_{1-4}$ alkylene-, —O—, NH—, or —C(=O)—.

In some embodiments, n is 2 and m is 2. In other embodiments, n is 1 and m is 3. In yet other embodiments, n is 0 and m is 4.

In some embodiments, each $R^4$ in the polyaziridine crosslinker is an aziridine group of formula (a):

In some embodiments, each $R^4$ in the polyaziridine crosslinker is an aziridine group of formula (b):

(b)

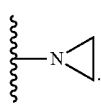

The polyaziridine crosslinker contains at least two $R^4$ groups. In some embodiments, all of the $R^4$ groups in the crosslinker have formula (a). In other embodiments, all of the $R^4$ groups in the crosslinker have formula (b). In yet other embodiments, one of the $R^4$ groups in the crosslinker have formula (a), and the remaining $R^4$ groups in the crosslinker have formula (b). In yet other embodiments, one of the $R^4$ groups in the crosslinker have formula (b), and the remaining $R^4$ groups in the crosslinker have formula (a).

In some embodiments, each of (a) and (b) is optionally substituted with 1 or 2 substituents. In some aspects of these embodiments, each of these optional substituents can be $C_{1-3}$ alkyl, $C_{1-3}$ alkoxy, $C_{1-3}$ haloalkyl, or $C_{1-3}$ haloalkoxy.

In some embodiments, the polyaziridine crosslinker is a compound of formula:

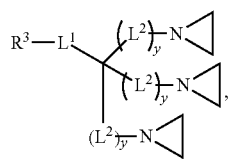

or a salt thereof, where y, $L^1$, $L^2$, and $R^3$ are as described earlier.

In some embodiments, the polyaziridine crosslinker is a compound of formula:

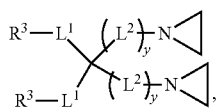

or a salt thereof, where y, $L^1$, $L^2$, and $R^3$ are as described earlier.

In some embodiments, the polyaziridine crosslinker is any of the following compounds:

(CAS Reg. No. 57116-45-7)

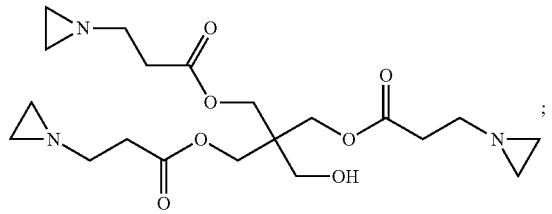

(CAS Reg. No. 52234-82-9)

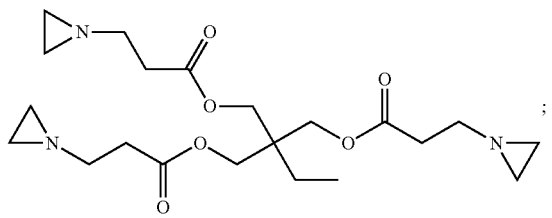

(CAS Registry No. 64265-57-2)

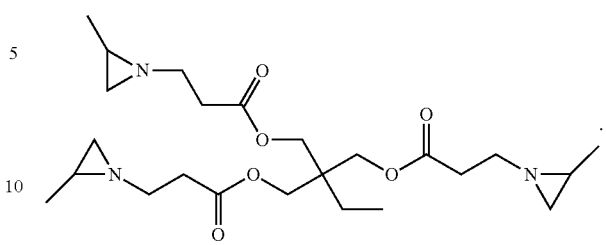

In some embodiments, the polyaziridine is water soluble. In some embodiments, both the crosslinkable copolymer and the polyaziridine are water soluble. Examples of commercially available polyaziridines include PZ-28 and PZ-33 available from Polyaziridine, LLC. Medford, N.J., USA, HD-105 from Shanghai Holdenchem CO, Ltd, Shanghai, China, and Crosslinker CX-100 from DSM Coating Resins, LLc, The Netherlands, nd Xama 7 available from ichemco Co, Italy.

Crosslinking Reaction Products

The composition can also include reaction products of the maleic anhydride copolymer and the polyaziridine crosslinker. In some embodiments, the product of this crosslinking reaction is a gel (for example, the composition comprising the reaction products is a gel). In some embodiments, the crosslinking reaction occurs between at least two hydrolyzed repeat units of the maleic anhydride copolymer and the polyaziridine crosslinker. In some aspects of these embodiments, the crosslinking reaction occurs between carboxyl groups of at least two hydrolyzed repeat units of the copolymer, and at least two aziridine groups of the polyfunctional crosslinker. For example, the crosslinking reaction between the copolymer and the polyaziridine crosslinker occurs as shown in the following scheme:

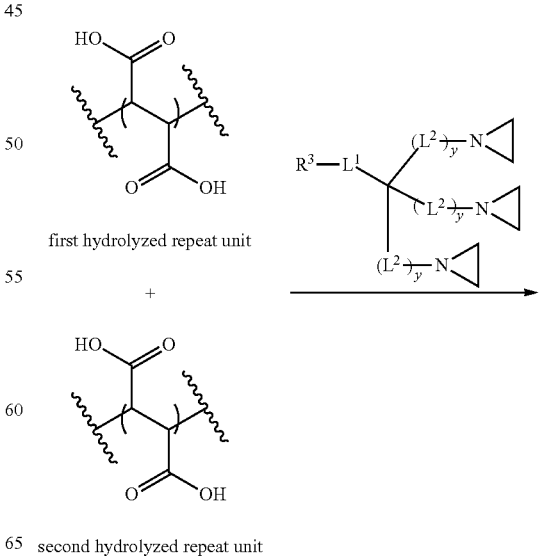

first hydrolyzed repeat unit

+ second hydrolyzed repeat unit

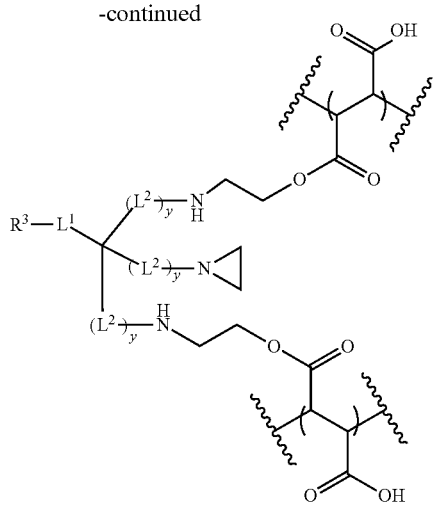

Referring to the reaction scheme, the aziridine moiety in the crosslinker reacts with a carboxyl group of a hydrolyzed repeat unit forming an ester product. The remaining aziridine rings of the polyfunctional crosslinker can further react with a carboxyl group of the same hydrolyzed repeat unit, or with a carboxyl group of a different hydrolyzed repeat unit within the maleic anhydride copolymer, thereby forming a crosslinked network. In some embodiments, the presence of the products of the crosslinking reaction between a maleic anhydride copolymer and a polyaziridine crosslinking reagent contributes to the composition becoming a gel. In some embodiments, when the composition is a gel, at least about 10%, about 25%, about 50%, about 75%, or about 100% of the total amount of polyaziridine crosslinker in the composition, has reacted with the hydrolyzed repeat units of the maleic anhydride copolymer.

In some embodiments, the crosslinking reaction to form a gel can occur at a temperature in the range of about 30° F. to about 200° F., about 35° F. to about 150° F., about 40° F. to about 120° F., about 40° F. to about 100° F., or about 40° F. to about 70° F. For example, the crosslinking reaction to form a gel can occur at about 30° F., about 35° F., about 40° F., about 45° F., about 50° F., about 60° F., about 70° F., about 80° F., or about 100° F. In some embodiments, the crosslinking reaction can occur at a variable temperature, for example at a temperature rising from about 40° F. to about 70° F., or from about 70° F. to about 100° F.

In some embodiments, the composition has a gel time of less than about 24 hours at about 70° F. For example, the composition can have a gel time of less than about 24 hours at about 70° F. when the maleic anhydride copolymer and polyaziridine crosslinker are about 1% to about 5%, about 5% to about 10%, about 10% to about 20%, or about 20% to about 30% by weight of the composition. The composition can have a gel time of less than about 24 hours at about 70° F. when the maleic anhydride copolymer and polyaziridine crosslinker are about 10% to about 20% by weight of composition and the carrier fluid is aqueous (for example, drilling fluid). In some embodiments, the composition can have a gel time of less than about 24 hours, less than about 20 hours, less than about 12 hours, less than about 8 hours, less than about 6 hours, less than about 4 hours, less than about 2 hours, or less than about 1 hour and 30 minutes (1.5 hours) at about 70° F. In some embodiments, the composition can have a gel time of more than about 1 minute, more than about 2 minutes, more than about 5 minutes, more than about 10 minutes, more than about 15 minutes, or more than about 20 minutes at about 70° F. For example, the composition can have a gel time of about 25 minutes, about 30 minutes, about 35 minutes, about 40 minutes, about 1 hour, about 1 hour and 10 minutes, or about 1 hour and 25 minutes at about 70° F.

In some embodiments, the composition has a gel time of less than about 24 hours at about 40° F. For example, the composition can have a gel time of less than about 20 hours at about 40° F. when the maleic anhydride copolymer and polyaziridine crosslinker are about 1% to about 5%, about 5% to about 10%, about 10% to about 20%, or about 20% to about 30% by weight of the composition. The composition can have a gel time of less than about 18 hours at about 40° F. when the maleic anhydride copolymer and polyaziridine crosslinker are about 10% to about 20% by weight of composition and the carrier fluid is aqueous (for example, drilling mud or a pill). In some embodiments, the composition can have a gel time of less than about 24 hours, less than about 20 hours, less than about 12 hours, less than about 8 hours, less than about 6 hours, less than about 4 hours, less than about 4 hours, or less than about 2 hours, at about 40° F. In some embodiments, the composition can have a gel time of more than about 1 minute, more than about 2 minutes, more than about 5 minutes, more than about 10 minutes, more than about 15 minutes, more than about 20 minutes, more than 30 minutes, more than 45 minutes, more than 1 hour, or more than 1 hour and 30 minutes at about 40° F. For example, the composition can have a gel time of about 25 minutes, about 30 minutes, about 35 minutes, about 40 minutes, about 1 hour, about 1 hour and 10 minutes, or about 1 hour and 30 minutes at about 40° F.

In some embodiments, the composition has a gel time in a range of about 1 minute to about 4 hours, about 5 minutes to about 3 hours, about 10 minutes to about 2.5 hours, about 10 minutes to about 2 hours, or about 10 minutes to about 1.5 hours, at an operational temperature (for example, about 30° F., about 40° F., about 50° F., about 60° F., about 70° F., about 80° F., about 100° F., about 120° F., about 150° F., or about 200° F., or a variable temperature such as temperature rising from about 40° F. to about 100° F.).

In some embodiments, the gel time of the composition can be adjusted according to operational temperature and operational needs, for example, by using gel time control agents and gel stabilizing agents as described earlier.

In some embodiments, the gel time can be defined as the time at which slope of the curve (viscosity versus time) increases sharply. A "stiff gel" can be defined as a gel that when taken out of its container retains its shape and does not deform. A "ringing gel" can be defined as a gel that when a container containing the gel is gently tapped on a hard surface, it will vibrate like a tuning fork. A "lipping or weaker gel" can be defined as a gel that when a container holding the gel is tilted, the gel will deform and tend to extend, elastically, in the direction of the tilt.

In some embodiments, the composition comprising a crosslinked reaction product can form a sealant (for example, a sealant gel). In some embodiments, the sealant is a stiff gel, a ringing gel, or a lipping gel.

Optional Additional Crosslinkers in the Composition

In some embodiments, the compositions for treating a subterranean formation also includes an additional crosslinking agent, such as an amine crosslinker or an aminosilane crosslinker, or a combination thereof. In some embodiments, the amine crosslinker includes at least one of a polyalkyleneimine, polyetheramine, polyalkylenepolyamine, aliphatic amine, polyfunctional aliphatic amine, arylalkylamine, heteroarylalkylamine, chitosan. For example, the amine crosslinker can include at least one of polyethyleneimine, ethylenediamine, diethylenetriamine (DETA), triethylenetetraamine (TETA), tetraethylenepentaamine (TEPA), 1,2-propylenediamine, 1,3-propylenediamine, dipropylenetriamine, tripropylenetetramine, tetrapropylenepentamine, ethylene propylene triamine, ethylene dipropylene tetramine, diethylene propylene pentamine, ethylene tripropylene pentamine, diethylene dipropylene pentamine, triethylene propylene pentamine, polyethylenimine (for example, EPOMIN® from Nippon Shokubai, LUPASOL™ from BASF, LUPAMINE™ from BASF, etc.), poly(ethyleneoxy)amine (for example, JEFFAMINE® EDR-148 from Huntsman Corporation), and poly(propyleneoxy)amine (for example, JEFFAMINE® T-403 from Huntsman Corporation, Polyetheramine T-5000 from BASF). Additionally, the amine crosslinker can be selected from the group consisting of polyethyleneimine, poly(ethyleneoxy)amine, and TEPA. In some embodiments, the amine crosslinker is a polyetheramine. In some embodiments, the amine crosslinker is an aliphatic amine. In some embodiments, the amine crosslinker is TEPA.

Suitable aminosilane crosslinkers include aminosilanes having at least a single primary amine group, such as aminoalkoxysilanes, and aminoalkyaminoalkylalkoxysilanes. Examples of suitable aminoalkoxysilanes include aminotrialkoxysilanes, such as 3-aminopropyltriethoxysilane, 2-aminoethyl-3-aminopropyl-trimethoxysilane, and $N^1$-(3-trimethoxysilylpropyl)-diethylenetriamine, depicted below.

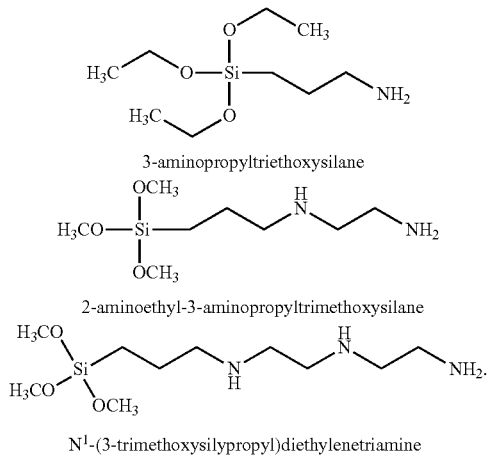

3-aminopropyltriethoxysilane 2-aminoethyl-3-aminopropyltrimethoxysilane $N^1$-(3-trimethoxysilypropyl)diethylenetriamine Carrier Fluid In some embodiments, a carrier fluid can be admixed with the composition containing a crosslinkable maleic anhydride copolymer and a polyaziridine crosslinker.

In some embodiments, the carrier fluid can include water, brine, produced water, flowback water, brackish water, Arab-D-brine, sea water, or combinations thereof. In some embodiments, the composition including the maleic anhydride copolymer, polyaziridine crosslinker, optionally an additional crosslinking reagent, and optionally an additional ingredient such as a gel time control agent, can be combined with any suitable downhole fluid before, during, or after the placement of the composition in a subterranean formation or the contacting of the composition and a subterranean material. In these embodiments, the suitable downhole fluid is the carrier fluid. For example, the composition can be combined with a downhole fluid uphole of the surface, and then the combined composition can be placed in a subterranean formation or contacted with a subterranean material. Alternatively, the composition can be injected into a subterranean formation to combine with a downhole fluid. Suitable examples of the downhole fluid include a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. In some embodiments, a drilling fluid can be admixed as a carrier fluid with the composition containing a crosslinkable maleic anhydride copolymer and a polyaziridine crosslinking agent.

A pill is a relatively small quantity (for example, less than about 500 oil barrels (bbl), or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this document as a component of a drilling fluid. In some embodiments, a pill can be admixed as a carrier fluid with the composition containing a crosslinkable maleic anhydride copolymer and a polyaziridine crosslinking agent.

Optional Additional Ingredients

In some embodiments, the composition containing a maleic anhydride copolymer and a polyaziridine crosslinker also includes an additional component. It is understood by one skilled in the art that an additive can be classified under more than one category. For example, sodium hydrogen phosphate can be considered as salt of a weak acid, namely phosphoric acid and a strong base, namely sodium hydroxide. It is also a buffer, because it has both acid and base components that can function as a buffering agent. The same compound can also function as a calcium precipitating agent, since calcium phosphate that is formed in the reaction between calcium hydroxide or calcium silicate both, of which are components of set cement and sodium hydrogen phosphate, is insoluble in water. Similarly, citric acid and an organic base such as ethanolamine or an inorganic base such as sodium hydroxide or sodium phosphate forms a buffer system that contains partially neutralized citric acid. The resulting citrate salt is a calcium chelating agent, as well as a calcium precipitating agent while functioning as a component of the buffer system. The partially neutralized citric acid can also act as an agent reactive with hydroxide present as calcium hydroxide in set cement.

In some embodiments, the additional component in the composition is a gel time control agent. The gel time control agent can accelerate or retard the crosslinking of the maleic anhydride copolymer and the polyaziridine and thus can accelerate or retard the gelling of the composition. Suitable gel time control agents include salts that yield a basic solution when dissolved in water, salts that yield an acidic solution when dissolved in water, uncharged organic molecules that yield a basic solution when dissolved in water, uncharged organic molecules that yield an acidic solution when dissolved in water (for example, citric acid), and pH buffers. Salts and uncharged organic molecules that yield a basic solution when dissolved in water, such as sodium hexametaphosphate, sodium bicarbonate, sodium carbonate, sodium tetraborate, trisodium phosphate (TSP) ($Na_3PO_4$), monoethanolamine, triethanolamine, and N,N-dimethyl ethylene diamine, can retard the gel time (decelerate gelling) of the composition. Salts and uncharged organic molecules that yield an acidic solution when dissolved in water, such as the pentasodium salt of amino tri(methylene phosphonic acid), sodium acid phyrophosphate, disodium hydrogen phosphate, sodium dihydrogen phosphate, sodium hydrogen sulfate, and monosodium citrate, can shorten the gel time (accelerate gelling) of the composition. Buffers prepared from Bronsted acids and Bronsted bases, such as citric acid and sodium hydroxide, or Bronsted acids and Lewis bases, such as citric acid and monoethanolamine, and buffers produced from Lewis acids and Lewis bases, such as boric acid and monoethanolamine, can retard or accelerate the gel time of the composition. As such, compositions can be formulated with a buffer to achieve a gel time suitable for specific downhole requirements. Other examples of suitable Bronsted acids include mineral acids such as hydrochloric acid, sulfuric acid, phosphoric acid, and nitric acid, and organic acids such as tartaric acid and benzene sulfonic acid, methane sulfonic acid, and the like. Other examples of Bronsted bases include sodium carbonate, sodium bicarbonate, potassium hydroxide ammonium hydroxide, and the like. Other examples of Lewis bases include diethanolamine, triethanolamine, triisopropanolamine, and dimethylaminoethanol. In some embodiments, the gel time control agent accelerates the crosslinking reaction as described later and therefore accelerates formation of the gel from the maleic anhydride and the polyaziridine crosslinker. In some aspects of these embodiments, the acceleration occurs in the absence of set cement. In other aspects of these embodiments, the acceleration occurs in the presence of set cement. In some embodiments, the gel time control agent retards the crosslinking reaction as described later, and therefore retards formation of the gel from the maleic anhydride and the polyaziridine crosslinker. In some aspects of these embodiments, the retardation of the crosslinking reaction occurs in the absence of set cement. In other aspects of these embodiments, the retardation of the crosslinking reaction occurs in the presence of set cement.

In some embodiments, the additional component in the composition is a gel stabilizing agent. That is, the composition containing a maleic anhydride copolymer and a polyaziridine crosslinker also includes a gel stabilizing agent. The gel stabilizing agent can include a calcium chelating agent, a calcium precipitating agent, a pH buffer, an agent reactive with hydroxide, or an acid generating agent. Examples of acid generating materials include monomeric and polymeric organic esters and anhydrides. Examples of such materials include triethyl citrate, diethyl tartrate, poly(lactic acid) and succinic anhydride. In some embodiments, the gel stabilizing agent initiates the crosslinking of the crosslinkable components of the composition, and stabilizing the gel of the composition.

In some embodiments, the gel stabilizing agent is a salt formed by a reaction between a weak acid and a base. The base can be strong or weak, organic or inorganic. In other embodiments, the gel stabilizing agent is a buffer solution formed from a weak organic acid and a weak organic base. Examples of such gel stabilizing agents include sodium hexametaphosphate, sodium tetraborate (synthetic or mineral borax), disodium hydrogen phosphate, sodium carbonate, sodium phosphate, the pentasodium salt of amino tris (methylene phosphonic acid), and a solution of ethanolamine and citric acid.

In some embodiments, the composition containing a maleic anhydride copolymer and a polyaziridine crosslinker also includes an inorganic salt. The salt can be about 1% to about 10% by weight of the composition. The salt can be selected from NaCl, NaBr, KCl, KBr, $CaCl_2$, $MgCl_2$, $NaNO_3$, $KNO_3$, $NaC_2H_3O_2$, $KC_2H_3O_2$, $NaCHO_2$, $KCHO_2$, or combinations thereof. For example, the salt can be selected from the group consisting of NaCl, KCl, and combinations thereof.

In some embodiments, the composition can include one or more organic solvents. Suitable examples of organic solvents include dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone.

The composition can further include a viscosifier, in addition to the maleic anhydride copolymer and polyaziridine crosslinker. The viscosifier can be present in any suitable concentration, such as more, less, or an equal concentration as compared to the concentration of the maleic anhydride copolymer and polyaziridine crosslinker. The viscosifier can include at least one of a substituted or unsubstituted polysaccharide. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

Properties of the Composition

In some embodiments, an amount of a maleic anhydride copolymer in the composition is in the range of about 1 wt. % to about 50 wt. %, about 1 wt. % to about 40 wt. %, about 1 wt. % to about 30 wt. %, about 1 wt. % to about 20 wt. %, about 1 wt. % to about 18 wt. %, about 1 wt. % to about 15 wt. %, about 1 wt. % to about 12 wt. %, about 1 wt. % to about 10 wt. %, or about 1 wt. % to about 5 wt. %, based on the weight of the composition. For example, the amount of the maleic anhydride copolymer in the composition is about 1 wt. %, about 5 wt. %, about 7 wt. %, about 10 wt. %, about 12 wt. %, about 15 wt. %, about 20 wt. %, about 25 wt. %, about 30 wt. %, about 35 wt. %, about 40 wt. %, or about 50 wt. %, based on the weight of the composition.

In some embodiments, an amount of a polyaziridine crosslinker in the composition is in the range of about 0.1 wt. % to about 25 wt. %, about 0.1 wt. % to about 15 wt. %, about 0.1 wt. % to about 10 wt. %, about 0.1 wt. % to about 5 wt. %, about 0.5 wt. % to about 5 wt. %, or about 1 wt. % to about 4 wt. %, based on the weight of the composition. For example, the amount of polyaziridine crosslinker in the composition is about 0.1 wt. %, about 0.25 wt. %, about 0.4 wt. %, about 0.5 wt. %, about 0.75 wt. %, about 1 wt. %, about 1.25 wt. %, about 1.5 wt. %, about 2 wt. %, about 2.5 wt. %, about 4 wt. %, about 5 wt. %, or about 10 wt. %, based on the weight of the composition.

In some embodiments, an amount of a polyaziridine crosslinker in the composition is in the range of about 1 wt. % to about 50 wt. %, about 1 wt. % to about 40 wt. %, about 1 wt. % to about 30 wt. %, about 1 wt. % to about 20 wt. %, about 1 wt. % to about 18 wt. %, about 1 wt. % to about 15 wt. %, about 1 wt. % to about 12 wt. %, about 1 wt. % to about 10 wt. %, about 1 wt. % to about 7 wt. %, about 1 wt. % to about 5 wt. %, or about 1 wt. % to about 3 wt. %, based on the weight of the maleic anhydride copolymer. For example, an amount of the polyaziridine crosslinker in the composition is about 0.1 wt. %, about 0.5 wt. %, about 1 wt. %, about 2 wt. %, about 5 wt. %, about 7 wt. %, about 10 wt. %, about 12 wt. %, about 13 wt. %, about 15 wt. %, about 20 wt. %, about 25 wt. %, or about 30 wt. % based on the weight of the maleic anhydride copolymer.

In some embodiments, the ratio of the maleic anhydride copolymer to the polyaziridine crosslinker is about 50:1 to about 1:1. For example, the weight ratio of the crosslinkable polymer to the amine crosslinker can be about 40:1 to about 1:1, about 30:1 to about 1:1, about 20:1 to about 1:1, about 15:1 to about 1:1, about 10:1 to about 1:1, about 9:1 to about 1:1, about 7:1 to about 1:1, about 5:1 to about 1:1, about 4:1 to about 1:1, about 3:1 to about 1:1, or about 2:1 to about 1:1, or about 50:1, about 40:1, about 30:1, about 20:1, about 15:1, about 10:1, about 9:1, about 8:1, about 7:1, about 6:1, about 5:1, about 4:1, about 3:1, about 2:1, or about 1:1. One of ordinary skill in the art will appreciate that the ratio of the maleic anhydride copolymer to the amine crosslinker can be varied based on the desired properties of the crosslinked product to be formed, such as the desired gel time.

In some embodiments, a combined amount of a maleic anhydride copolymer and a polyaziridine crosslinker in the composition is in a range of about 5 wt. % to about 50 wt. %, or about 10 wt. % to about 30 wt. % relative to a weight of the composition.

In some embodiments, when the composition includes a salt, such as an inorganic salt, an amount of the salt in the composition can be about 1% to about 10% by weight of the composition.

In some embodiments, when the composition includes an aqueous carrier, the aqueous carrier is about 1% to about 99% by weight of the composition. In some embodiments, the aqueous carrier is about 5% to about 99% by weight of the composition. For example, the aqueous carrier can be about 10%-98%, 20%-98%, 30%-98%, 40%-98%, 50%-98%, 60%-98%, 70%-98%, 80%-98%, or about 85%-98% by weight of the composition or about 10%, 20%, 30%, 40%, 50%, 60%, 70%, 80%, 85%, 90%, 91%, 92%, 93%, 94%, 95%, 96%, 97%, or about 98% by weight of the composition. The aqueous carrier can be about 90% by weight of the composition. The aqueous carrier can be about 95% of the composition by weight of the composition.

In some embodiments, when the composition includes an additional crosslinker, such as an amine crosslinker (for example, TEPA), the weight ratio of the maleic anhydride copolymer to the amine crosslinker can be about 50:1 to about 1:1, about 40:1 to about 1:1, about 30:1 to about 1:1, about 20:1 to about 1:1, about 15:1 to about 1:1, about 10:1 to about 1:1, about 7:1 to about 1:1, or about 5:1 to about 1:1. The weight ratio of the maleic anhydride copolymer to the amine crosslinker (for example, TEPA) can be about 20:1, about 15:1, about 10:1, about 7:1, or about 5:1.

In some embodiments, when the composition includes an amine crosslinker such as TEPA, the amount of the amine crosslinker is in the range of about 0.1 wt. % to about 25 wt. %, about 0.1 wt. % to about 15 wt. %, about 0.1 wt. % to about 10 wt. %, about 0.1 wt. % to about 5 wt. %, about 0.5 wt. % to about 5 wt. %, or about 1 wt. % to about 4 wt. %, based on the weight of the composition. For example, the amount of polyaziridine crosslinker in the composition is about 0.1 wt. %, about 0.25 wt. %, about 0.4 wt. %, about 0.5 wt. %, about 0.75 wt. %, about 1 wt. %, about 1.25 wt. %, about 1.5 wt. %, about 2 wt. %, about 2.5 wt. %, about 4 wt. %, about 5 wt. %, or about 10 wt. %, based on the weight of the composition.

In some embodiments, when the composition includes an amine crosslinker such as TEPA, the amount of the amine crosslinker is about 1 wt. %, about 2 wt. %, about 5 wt. %, about 7 wt. %, about 10 wt. %, about 12 wt. %, about 13 wt. %, about 15 wt. %, or about 20 wt. %, based on the weight of the maleic anhydride copolymer.

In some embodiments, when the composition includes an optional additional ingredient, an amount of the additional ingredient in the composition is in the range of about 0.1 wt. % to about 20 wt. %, based on the weight of the composition. For example, when the composition includes a gel stabilizing agent, the gel stabilizing agent can be about 0.5% to about 10% of the composition by weight. In some cases, the gel stabilizing agent is about 0.5% to about 2.5% of the composition by weight. In another example, when the composition includes a gel time control agent, an amount of the gel time control agent is in the range of about 0.1 wt. % to about 10 wt. %, or about 0.5 wt. % to about 5 wt. %, based on the weight of the composition. In some cases, the gel time control agent is about 0.5 wt. %, about 1 wt. %, about 2 wt. %, about 3 wt. %, about 4 wt. %, or about 5 wt. %. In some embodiments, the composition includes a citric acid as a gel time control agent. In other embodiments, the composition includes trisodium phosphate (TSP) as gel time control agent. In yet other embodiments, the composition includes a combination of citric acid and trisodium phosphate as gel time control agent.

In some embodiments, the composition includes a maleic anhydride copolymer (for example, ISOBAM® 104), a polyaziridine crosslinker (for example, PZ-33), optionally an additional amine crosslinker (for example, TEPA), a carrier fluid (for example, water), and optionally a gel time control agent (for example, citric acid, TSP, or combination thereof). These ingredients can be present in the composition in any of the amounts described earlier.

The composition can have a basic pH or an acidic pH. The pH of the composition affect the rate of a crosslinking reaction as described later, and therefore, can be shortening or prolonging the time at which the composition becomes a gel. In some examples, the composition has a pH of about 3 to 10, about 5 to about 7, about 7 to about 10, about 8 to about 9, or about 5 to about 9. In other examples, the composition has a pH of about 3 to about 6, about 3 to about 7, or about 4 to about 6. In some embodiments, the composition can have a basic pH. For example, the composition can have a pH of about 7 to about 9, about 7 to about 11, about 7.5 to about 10, or about 8 to about 9. In some embodiments, the composition has a pH of about 8 to about 9. The composition can have a pH of about 5, about 7, about 7.5, about 8, about 8.5, about 9, about 10, or about 11.

The composition can have low viscosity, medium viscosity, or can be highly viscous. The viscosity of the composition affects the ability of the composition to freely flow into the pores of a subterranean formation prior to crosslinking and forming a gel. For example, prior to crosslinking, the low or medium viscous composition can flow into and occupy cracks and clefts in the cement sheath, or in microannuli, or both. In some embodiments, the viscosity of the composition is in the range of about 10 centipoise (cP) to about 200 cP, about 10 cP to about 180 cP, about 10 cP to about 150 cP, about 20 cP to about 200 cP, about 20 cP to about 180 cP, about 20 cP to about 150 cP, about 50 cP to about 200 cP, 10 cP to about 100 cP, 80 cP to about 100 cP, or about 80 cP to about 120 cP. For example, the viscosity of the composition is about 50 cP, about 80 cP, about 100 cP, about 120 cP, about 150 cP, or about 200 cP. In some embodiments, the viscosity of the composition is less than about 100 cP.

Method of Treating a Subterranean Formation

Also provided in this disclosure is a method of treating a subterranean formation including providing to a subterranean formation a composition described earlier and crosslinking the composition (for example, allowing the crosslinking reaction between hydrolyzed repeat units of maleic anhydride copolymer and the polyaziridine crosslinker to occur) to form a sealant.

In some embodiments, the providing occurs uphole of the surface. The providing can also occur in the subterranean formation.

The subterranean formation can contain a wellbore containing a steel casing or multiple casings, a cement sheath in the annuli, and optionally a packer and a production tubing. The cement sheath, the casings, and the production tubing in the wellbore can experience annular pressure buildup due to, for example, gas flow through microchannels in the annulus, forming microannuli, and fractures (for example, microfractures), cracks and clefts within or around the cement sheath, the casing, or the production tubing. This can result in unwanted fluids entering the wellbore, and also in loss of recoverable fluids in producing wells, which can require remediation and well shut off, in some cases with substantial financial impact. In some embodiments, the gel, as described earlier, can seal such fractures and microannuli, for example, to prevent unwanted flow of fluids, and to return the well to the desired producing condition. In some embodiments, sealing the fractured wellbore includes forming a gel plug in the desired locations. In these embodiments, the composition as described earlier in an uncrosslinked state can be placed (for example, freely flow) into an appropriate location in the wellbore (for example, microannuli or microfractures in a cement sheath of a wellbore), followed by crosslinking the maleic anhydride copolymer and the polyaziridine crosslinking reagent (for example, in contact with set cement) after a predetermined gel time, thereby forming a gel plug and sealing the microannuli or the microfractures.

In some embodiments, forming the sealant occurs near at least one of a casing, a casing-casing annulus, a tubing-casing annulus, or a casing-formation annulus. In some embodiments, forming the sealant occurs in a void (for example, cracks, microannuli, etc.) in at least one of a cement, cement sheath, and pipe.

In some embodiments, forming the sealant prevents or retards undesired loss or flow of wellbore fluid into the formation or of formation fluids into the wellbore. In some embodiments, the sealant prevents or retards undesired loss or leak of fluid into the formation.

Also, provided in this disclosure is a method of preventing or alleviating loss of drilling fluid or other fluid circulation in a wellbore penetrating a subterranean formation. In some embodiments, the composition including the maleic anhydride copolymer, polyaziridine crosslinker, and gel stabilizing agent is provided in a weighted or unweighted "pill" for introduction into the wellbore. Such "pills" typically comprise the composition blended with a required amount of water, base oil, water base drilling fluid, or non-aqueous base drilling fluid and in some cases a weighting agent such as barite, calcium carbonate, or a salt. The amount of the composition used in the pill depends on the size of the subterranean fracture, opening, or lost circulation zone to be treated. Multiple pills or treatments can be used if needed. In some embodiments, drilling is stopped while the pill including the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry. In some embodiments, the composition including the maleic anhydride copolymer, polyaziridine crosslinker, and gel stabilizing agent also contains loss circulation materials capable of packing inside the loss circulation zone and forming a solid bridge across the loss circulation zone while the resin sets (for example, crosslinking reaction occurs) in and around the packed block thereby enhancing the effectiveness of the loss circulation material.

Servicing a wellbore includes providing a composition including a maleic anhydride copolymer and a polyaziridine crosslinker (and optionally a gel time control agent) within a portion of at least one of a wellbore and a subterranean formation.

In some embodiments, the composition is introduced into at least one of a wellbore and a subterranean formation using a pump. In some embodiments, the composition can be introduced to an appropriate location by top-down squeezing down the annulus. In other embodiments, the composition can be introduced to an appropriate location by injecting the composition downhole. Any conventional injection can be used to inject the composition in a certain location in a wellbore. The maleic anhydride copolymer, the polyaziridine crosslinker, and optionally the gel time control agent can be pumped together from at least one source or simultaneously from at least two different sources. Alternatively, the maleic anhydride copolymer can be pumped first and the polyaziridine crosslinker and the gel time control agent can be pumped second. Alternatively, the polyaziridine crosslinker and gel time control agent can be pumped first and the maleic anhydride copolymer can be pumped second. In some cases, the gel time control agent can be pumped with the maleic anhydride copolymer and the polyaziridine crosslinker can be pumped separately. In certain cases, the maleic anhydride copolymer, the polyaziridine crosslinker, and optionally the gel time control agent can all be pumped separately.

In some embodiments, the composition forming a sealant, such as a stiff gel plug, can be used as a conformance control, a wellbore plug and abandonment, or thermal wellbore isolation gel system.

EXAMPLES

Materials and Methods

The polymer used in this study was a poly(maleic anhydride/isobutylene)copolymer with a monomer ratio of 1:1 and a weight-average molecular weight of $5\times10^4$ partially hydrolyzed with ammonium hydroxide to generate amide-ammonium type of hydrolyzed functional groups, obtained from a commercial source (ISOBAM 104 from Kuraray Co., Ltd.).

To crosslink the base poly(maleic anhydride/isobutylene) copolymer to provide suitable gel times (crosslink times) for placement downhole a polyaziridine crosslinker (trade name PZ-33) was used, supplied by Polyaziridine LLC. In examples 4-5, tetraethylenepentamine (TEPA) was used as an additional amine-type crosslinker to crosslink the base poly(maleic anhydride/isobutylene)copolymer, using a polymer to amine weight ratio of about 10:1.

Gel time control agents, such as trisodium phosphate (TSP) and citric acid, were obtained from various commercial suppliers.

General Procedure

A general procedure included dissolving the copolymer in water to prepare a solution. To a stirred solution of the copolymer, a crosslinker was added in specified weight ratio with stirring. The solution mixtures were either kept in glass test tubes or kept in an oven at specified temperature, and observed for visible signs of gelation. Alternately, the gel times were measured using Brookfield Viscometer (DV2+ Model) supplied by Brookfield Engineering Laboratories, Inc. (Massachussetts, USA), and viscosity was monitored as a function of time at a specific temperature using a #3 spindle.

Example 1—Isobam 104, PZ-33 Crosslinker and TSP Gel Time Control Agent at 70° F.

| component | amount grams (g) |
|---|---|
| Water | 17 |
| Isobam 104 | 3 |
| TSP | 0.1 |
| PZ-33 | 0.4 |

Gel-time 35 minutes at 70° F.

Example 2—Isobam 104, PZ-33 Crosslinker and TSP Gel Time Control Agent at 40° F.

| component | amount (g) |
|---|---|
| Water | 17 |
| Isobam 104 | 3 |
| TSP | 0.1 |
| PZ-33 | 0.2 |
| Temp | 40° F. |
| Gel-time | 1 hr 38 min |

Gel-time 1 hour 38 minutes at 40° F.

Example 3—Isobam 104, PZ-33 Crosslinker, and TSP and Citric Acid Gel Time Control Agents at 70° F.

| component | amount (g) |
|---|---|
| Water | 17 |
| Citric Acid | 0.5 |
| Isobam 104 | 3 |
| TSP | 0.1 |
| PZ-33 | 0.6 |

Gel-time 25 minutes at 70° F.

Example 4—Isobam 104, PZ-33 and TEPA Crosslinkers, and TSP and Citric Acid Gel Time Control Agents at 70° F.

| component | amount (g) |
|---|---|
| Water | 17 |
| Citric Acid | 0.5 |
| Isobam 104 | 3 |
| TSP | 0.1 |
| TEPA | 0.2 |
| PZ-33 | 0.4 |

Gel-time 40 minutes at 70° F.

Example 5—Isobam 104, PZ-33 and TEPA Crosslinkers, and TSP and Citric Acid Gel Time Control Agents at 70° F.

| component | amount (g) |
|---|---|
| Water | 21.25 |
| citric | 0.625 |
| Isobam 104 | 3.75 |
| TSP | 0.125 |
| TEPA | 0.25 |
| PZ-33 | 0.25 |

Gel-time 1 hour 10 minutes at 70° F.

Example 6—Isobam 104, PZ-33 Crosslinker, and TSP and Citric Acid Gel Time Control Agents at 40° F.

| component | amount (g) |
|---|---|
| Water | 17 |
| citric | 0 |
| Isobam 104 | 3 |
| TSP | 0.1 |
| TEPA | 0 |
| PZ-33 | 0.2 |

Gel-time 1 hour 38 minutes at 40° F.

Example 7—Isobam 104, PZ-33, TEPA Crosslinkers, and TSP and Citric Acid Gel Time Control Agents at 70° F.

| component | amount (g) |
|---|---|
| Water | 21.25 |
| citric | 0.625 |
| Isobam 104 | 3.75 |
| TSP | 0.125 |
| TEPA | 0.25 |
| PZ-33 | 0.25 |

Gel-time 45 minutes at 70° F.

Example 8—Isobam 104, PZ-33, TEPA Crosslinkers, and TSP and Citric Acid Gel Time Control Agents at 70° F. Presence of Set Cement (Cement Soaked 1 hr in 5% TSP Solution

| component | amount (g) |
|---|---|
| Water | 21.25 |
| citric | 0.625 |
| Isobam 104 | 3.75 |
| TSP | 0.125 |
| TEPA | 0.25 |
| PZ-33 | 0.25 |

Gel-time 45 minutes at 70° F.

Example 9—Isobam 104, PZ-33, TEPA Crosslinkers, and TSP and Citric Acid Gel Time Control Agents at 70° F. Presence of Set Cement (Cement Soaked 1 hr in 5% TSP Solution

| component | amount (g) |
|---|---|
| Water | 21.25 |
| citric | 0.625 |
| Isobam 104 | 3.75 |
| TSP | 0.15 |
| TEPA | 0.25 |
| PZ-33 | 0.25 |

Gel-time 1 hour 5 minutes at 70° F.

As shown in the Examples 1-5, tri-functional aziridine PZ-33 is capable of crosslinking the maleic-co-isobutylene polymer. Various additive combinations can affect the gel times and are also present for stability in the cement matrix. For conformance control applications, the formulations can be used without any additional ingredients. Unexpected synergy between the dual crosslinkers namely polyaziridine and TEPA has shown improved long-term temperature stability. Other appropriate additional crosslinkers can be of the polyamine and polyethyleneimine family.

Traditionally resin systems do not function below standard ambient conditions, or if they do, react very slowly. The addition of the polyaziridine crosslinker allowed for formation of stable resin systems at 70° F. and down to 40° F. as shown in Example 6, with gel times ranging from 10 minutes to 1.5 hours depending on the dose rate. Water based resin systems are not typically able to be applied under these low temperature conditions, and the use of the multi-aziridine crosslinker allows for the use of water based resin system at temperature as low as 40° F. By using, for example, gel time control agents, the crosslinking can be adjusted to keep the treatment fluid to remain in uncrosslinked state until placement in the appropriate location. The formulations described in this document can be used for low temperature subsurface and subsea treatments. In addition to application for remedial cement repair, these low temperature resins can be useful for conformance control, plug and abandonment, or temporary wellbore isolation gel plug applications.

The formulations shown in Examples 7 and 8 have identical chemical composition; however, the formulation of Example 8 cures in the presence of set cement. The gel times are not effected by exposure to set cement with these exemplified formulation parameters. The formulation of Example 9 has cured in the presence of set cement.

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:
1. A method of treating a subterranean formation comprising:
i) providing to a subterranean formation a composition comprising:
a maleic anhydride copolymer, or a salt thereof; and
at least one hydrolyzed repeat unit selected from repeat units III and IV:

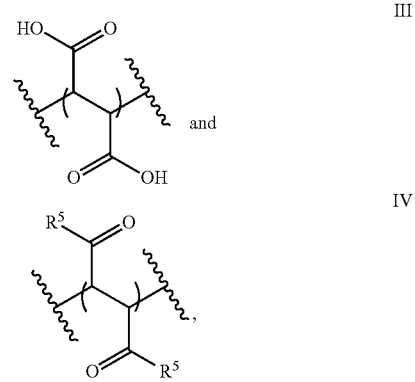

or a salt thereof, wherein each $R^5$ is independently selected from —OH and $NH_2$, provided that at least one of $R^5$ is $NH_2$, and
a polyaziridine crosslinker having the formula:

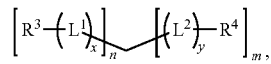

or a salt thereof, wherein:
$L^1$ and $L^2$ at each occurrence are each independently selected from the group consisting of —$C_{1-6}$ alkylene-, —$C_{1-6}$ alkenylene-, —$C_{1-6}$ alkynylene-, —(O—$C_{1-4}$ alkylene)$_p$-, —($C_{1-4}$ alkylene-O—)$_p$—, —O—, —S—, NH—, and —C(═O)—, wherein said —C$_{1-6}$ alkylene-, —C$_{1-6}$ alkenylene-, —C$_{1-6}$ alkynylene-, and —C$_{1-4}$ alkylene- are each optionally substituted with 1, 2, or 3 substituents independently selected from the group consisting of -halo, —CN, —OH, —C$_{1-3}$ alkyl, —C$_{1-3}$ alkoxy, —C$_{1-3}$ haloalkyl, —C$_{1-3}$ haloalkoxy, -amino, —C$_{1-3}$ alkylamino, and -di(C$_{1-3}$ alkyl)amino;

each R$^3$ is selected from the group consisting of —H, —C$_{1-6}$ alkyl, —C$_{1-6}$ alkenyl, —C$_{1-6}$ alkynyl, -halo, —CN, —OH, —C$_{1-3}$ alkoxy, —C$_{1-3}$ haloalkyl, —C$_{1-3}$ haloalkoxy, -amino, —C$_{1-3}$ alkylamino, -di(C$_{1-3}$ alkyl)amino, —(O—C$_{1-4}$ alkylene)$_p$-H, and (C$_{1-4}$ alkylene-O—)$_p$—C$_{1-6}$ alkyl;

each R$^4$ is selected from the group consisting of:

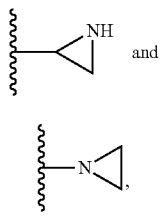

(a)

(b)

wherein each of (a) and (b) is optionally substituted with 1, 2, 3, or 4 substituents independently selected from the group consisting of halo, CN, OH, amino, C$_{1-3}$ alkylamino, di(C$_{1-3}$ alkyl)amino, —C$_{1-3}$ alkyl, C$_{1-3}$ alkoxy, C$_{1-3}$ haloalkyl, and C$_{1-3}$ haloalkoxy;

p at each occurrence is independently an integer from 0 to 40;

x and y at each occurrence are each independently an integer from 0 to 10;

m is an integer from 2 to 4; and n is an integer from 0 to 4;

provided that the sum of m and n is 4; and ii) crosslinking the maleic anhydride copolymer, or a salt thereof, and the polyaziridine crosslinker, or a salt thereof, to form a sealant.

2. The method of claim 1, wherein:

m is 3 and n is 1;

x is 1 and L$^1$ is selected from the group consisting of —C$_{1-6}$ alkylene-, —C$_{1-6}$ alkenylene-, —(O—C$_{1-3}$ alkylene)$_p$-, and —(C$_{1-3}$ alkylene-O—)$_p$—;

each p is an integer form 1 to 20;

R$^3$ is selected from the group consisting of H, —C$_{1-3}$ alkyl, —OH, —C$_{1-3}$ alkoxy, —C$_{1-3}$ haloalkyl, —C$_{1-3}$ haloalkoxy, —(O—C$_{1-3}$ alkylene)$_p$-H, and —(C$_{1-3}$ alkylene-O—)$_p$—C$_{1-3}$ alkyl;

each y is an integer from 0 to 5, and each L$^2$ is independently selected from C$_{1-4}$ alkylene-, —O—, NH—, and —C(═O)—; and each R$^4$ is selected from the group consisting of:

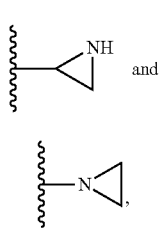

(a)

(b)

wherein each of (a) and (b) is optionally substituted with 1 or 2 substituents independently selected from the group consisting of —C$_{1-3}$ alkyl, C$_{1-3}$ alkoxy, C$_{1-3}$ haloalkyl, and C$_{1-3}$ haloalkoxy.

3. The method of claim 1, wherein the polyaziridine crosslinker is a compound of the formula:

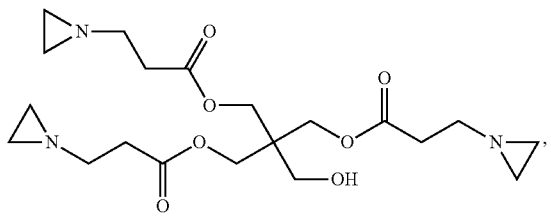 [SMILES: O=C(CCN1CC1)OCC(CO)(COC(=O)CCN1CC1)COC(=O)CCN1CC1]

or a salt thereof.

4. The method of claim 1, wherein the salt of the maleic anhydride copolymer is an ammonium salt, an alkali metal salt, or an alkali earth metal salt.

5. The method of claim 1, wherein the maleic anhydride copolymer comprises repeat units I and II:

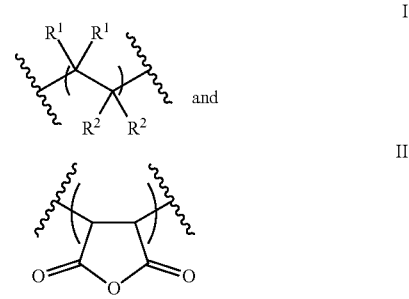

I and

II wherein each R$^1$ is independently selected from the group consisting of —H and —C$_{1-5}$ alkyl, and each R$^2$ is independently selected from the group consisting of —H and —C$_{1-5}$ alkyl.

6. The method of claim 5, wherein the repeat unit I has formula:

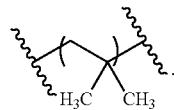

7. The method of claim 1, wherein the amount of the polyaziridine crosslinker in the composition is in a range of about 0.1 wt. % to about 20 wt. % relative to the amount of the maleic anhydride copolymer.

8. The method of claim 1, wherein the pH of the composition is from about 5 to about 9.

9. The method of claim 1, wherein the viscosity of the composition is from about 80 cP to about 120 cP.

10. The method of claim 1, wherein the combined amount of the maleic anhydride copolymer and the polyaziridine crosslinker in the composition is about 10 wt. % to about 30 wt. % relative to the weight of the composition.

11. The method of claim 1, wherein the composition comprises an amine crosslinker selected from the group consisting of a polyamine, a polyethyleneimine, and a combination thereof.

12. The method of claim 11, wherein the amine crosslinker is tetraethylenepentamine (TEPA).

13. The method of claim 1, wherein the composition has a gel time of less than about 1.5 hours at about 70° F.

14. The method of claim 1, wherein the composition has a gel time of less than about 3 hours at about 40° F.

15. The method of claim 1, wherein forming the sealant occurs near a casing, a casing-casing annulus, a tubing-casing annulus, or a casing-formation annulus.

16. The method of claim 1, wherein the sealant is a gel plug.

17. The method of claim 1, wherein the crosslinking of the composition occurs in contact with a set cement.

18. The method of claim 1, wherein the subterranean formation comprises a wellbore comprising a cement sheath.

19. The method of claim 18, wherein forming the sealant occurs in at least one of a fracture in the cement sheath or a microannulus.

20. The method of claim 18, wherein forming the sealant prevents or retards undesired loss or flow of a wellbore fluid into the subterranean formation or of a formation fluid into the wellbore.

21. The method of claim 18, wherein the maleic anhydride copolymer, or a salt thereof, and the polyaziridine crosslinker, or a salt thereof, are in an uncrosslinked state until placement in the desired location in the wellbore.

22. The method of claim 1, wherein the providing comprises top-down squeezing the composition down an annulus.

23. The method of claim 1, wherein the providing comprises injecting the composition downhole.

24. The method of claim 1, wherein forming the sealant comprises a conformance control, a wellbore plug and abandonment, or thermal wellbore isolation gel system.

25. A method of treating a subterranean formation comprising:

i) providing to a subterranean formation a composition comprising:

a maleic anhydride copolymer comprising:

the repeat units

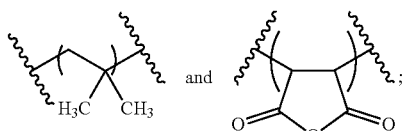

and at least one hydrolyzed repeat unit selected from the repeat units:

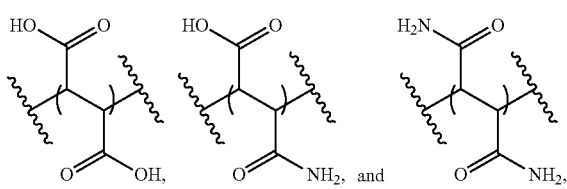

or a salt thereof; and a polyaziridine crosslinker having the formula:

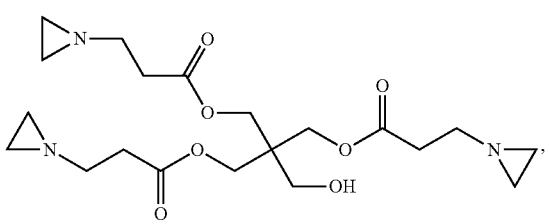 [SMILES: O=C(CCN1CC1)OCC(CO)(COC(=O)CCN1CC1)COC(=O)CCN1CC1]

or a salt thereof; and ii) crosslinking the maleic anhydride copolymer, or a salt thereof, and the polyaziridine crosslinker, or a salt thereof, to form a sealant.

26. The method of claim 25, wherein the composition comprises an amine crosslinker selected from the group consisting of a polyamine, a polyethyleneimine, and a combination thereof.

27. The method of claim 26, wherein the amine crosslinker is tetraethylenepentamine (TEPA).

* * * * *

UNITED STATES PATENT AND TRADEMARK OFFICE
CERTIFICATE OF CORRECTION

| | | |
|---|---|---|
| PATENT NO. | : 10,113,100 B1 | Page 1 of 1 |
| APPLICATION NO. | : 15/926200 | |
| DATED | : October 30, 2018 | |
| INVENTOR(S) | : Matthew Hilfiger and B. Raghava Reddy | |

It is certified that error appears in the above-identified patent and that said Letters Patent is hereby corrected as shown below:

On the Title Page

Item (73), under Assignee, please replace "Saudi Arabia Oil Company," with -- Saudi Arabian Oil Company, --

In the Claims

In Column 35, Line 12, in Claim 1, please replace "($C_{1-4}$" with -- – ($C_{1-4}$ --

Signed and Sealed this
Twenty-second Day of October, 2019

Andrei Iancu
*Director of the United States Patent and Trademark Office*